United States Patent [19]
Merkel et al.

[11] Patent Number: 5,403,041
[45] Date of Patent: Apr. 4, 1995

[54] TUBE- OR HOSE CONNECTOR FOR THE TRANSPORT OF A FLUID

[75] Inventors: Franz Merkel, Weisenbach; Wolfram Schnurr, Seebach; Dietmar Schmid, Gernsbach, all of Germany

[73] Assignee: Aeroquip GmbH, Baden-Baden, Germany

[21] Appl. No.: 160,689

[22] Filed: Dec. 2, 1993

[30] Foreign Application Priority Data

Dec. 4, 1992 [DE] Germany .................. 42 40 848.2

[51] Int. Cl.[6] ............................................. F16L 57/00
[52] U.S. Cl. ............................................ 285/4; 285/23;
285/190; 285/158; 285/319; 403/12
[58] Field of Search ............... 285/23, 3, 4, 190, 273,
285/319, 158; 403/12

[56] References Cited

U.S. PATENT DOCUMENTS

| | | | |
|---|---|---|---|
| 1,372,628 | 3/1921 | Mueller | 285/23 |
| 2,795,437 | 6/1957 | Mueller | 285/23 |
| 3,402,253 | 9/1968 | McCracken | 285/190 X |
| 4,900,173 | 2/1990 | Haldric et al. | 403/12 X |
| 5,228,725 | 7/1993 | Aoyagi et al. | 285/158 |

FOREIGN PATENT DOCUMENTS

| | | | |
|---|---|---|---|
| 3721591C1 | 9/1988 | Germany | |
| 9015281 | 12/1990 | WIPO | 285/319 |

*Primary Examiner*—Randolph A. Reese
*Assistant Examiner*—Heather Chun Shackelford
*Attorney, Agent, or Firm*—Hopkins & Thomas

[57] ABSTRACT

A tube- or hose connector for the transport of a fluid has at least at one end a ring type nipple 2 with a cross hole 4, which serves to mount the connector at an aggregate for receiving a banjo bolt 12 having a head 13 and a threaded shank 14 as well as two gaskets 10, 11. It has a protecting cap 18 to hold together a premounted unit of ring type nipple 2, banjo bolt 12, and the two gaskets 10 and 11, and has an approximately U-shaped form with a clamp 19, at the one end of which a flank 20 overlaps the head 13 of the banjo bolt 12 and at the other end of which a protecting cover 20 for the threaded shank 15 of the banjo bolt 12 is provided. The protecting cap 18 has an extension 26 supporting itself at the threaded shank 15 of the banjo bolt 12, and the protecting cover 22 is borne pivotably at the clamp 19.

10 Claims, 3 Drawing Sheets

TUBE- OR HOSE CONNECTOR FOR THE TRANSPORT OF A FLUID

BACKGROUND OF THE INVENTION

The invention relates to a tube- or hose connector for the transport of a fluid having at least at one end a ring type nipple with a cross hole, which serves to mount the connector at an aggregate for receiving a banjo bolt having a head and a threaded shank as well as two gaskets. A tube- or hose connector is understood to be a piece of tube or hose, which has at least at one end, preferably at both ends, though, connections to connect aggregates to each other. A pump can be connected to a cylinder with such a connector, for instance. The connector can have a piece of a tube, as well as a piece of a hose. The piece of the tube can be comparably short and can consist of just a nipple. A fluid is understood to be liquid or gaseous medium, which is sent through the connector in its mounted state. Tube- or hose connector of the type in question are used especially in the automotive industry, e.g. for power steering devices, air conditioning units, cooling units, etc. For this the individual aggregates have to be connected to each other with such a connector. Connnectors with connections that extend at right angles from or to the aggregates and protrude as little as possible are used in these cases, because cramped assembly conditions occur during the automotive manufacturing process. Especially useful to this end are connectors with connections that have a ring type nipple according to DIN 76 42, a banjo bolt according to DIN 76 43, as well as the accompanying gaskets. This type of tube- or hose connectors are concerned here.

Known tube- or hose connectors of the type described above have at least at one end a ring type nipple with a cross hole. The ring type nipple is attached to the piece of tube, especially by soldering, by which the interior of the tube is connected to the interior of the ring type nipple with the cross hole. The cross hole extends through the ring type nipple at a right angle with respect to the piece of tube and ends in sealing surfaces. These sealing surfaces are provided with two protecting covers at the manufacturer of the tube- or hose connector to prevent a damage of the sealing surfaces during the transport to the automotive factory. The tube- or hose connectors, banjo bolts, and gaskets are supplied seperately to the automotive factory. For the assembly the connector is taken and the two protecting covers are removed from the ring type nipple. Then a banjo bolt is taken, a gasket is put onto it, and the banjo bolt with the gasket is stuck through the cross hole of the ring type nipple. Afterwards a second gasket is put onto the threaded shank of the banjo bolt. The in this way preassembled unit is held with one hand at the tube or hose of the connector, while the other hand holds the banjo bolt with the two gaskets at the ring type nipple. Due to the often relatively far extending connectors and the cramped assembly conditions the following assembly of the connector is highly dependent on the skill of the mechanic. First the axis of the banjo bolt has to be aligned to the axis of the screw socket of the aggregate, and in this aligned position the banjo bolt must carefully be screwed in by one or two turns until the threads hold. Finally the banjo bolt is tightened with the aid of a tool—usually with a predetermined torque—in such a way that a fluid tight connection is obtained. During this assembly there is the danger that the banjo bolt retreats somewhat from the ring type nipple, so that the banjo bolt and/or at least the gasket on the threaded shank side fall down. Especially when only the gasket falls down this is usually not noticed and a fluid tight connection cannot be obtained anymore. The falling down of the banjo bolt often damages its thread, so that a second attempt to screw it in becomes difficult. The aggregates into the screw sockets of which the banjo bolt is screwed are often made of aluminum, a relatively soft material, so that in the second attempt to screw in the banjo bolt a seizure can occur, of which the mechanic does not know whether it is caused by a damage to the thread of the banjo bolt or because of a misaligned thread of the banjo bolt in the screw socket. In most cases he will assume the first cause is responsible and will use a tool to forcibly screw in the banjo bolt. In the soft material of the aggregate this is possible even when the axes of the threads are not aligned. A fluid tight connection is not attainable under these circumstances. Rather than that the screw socket of the aggregate, e.g. the pump of the power steering, will be damaged by this forced screwing-in. The damage caused by this is appreciable. The pump has to be removed at the end of the conveyor and replaced by a new pump, the consequences of the loss of the pressure medium have to be eliminated as well. In some cases the housing of the pump can be refinished. Often the complete pump must be installed in a new housing, though. The falling down of the gasket at the threaded shank side also happens without a retreating of the banjo bolt especially when the connector must be mounted in such a relative position that the threaded shank of the banjo bolt is pointed downwards. In these cases the little finger of one hand is used to prevent the falling down of this gasket. The falling down of the banjo bolt and/or the gasket is often also connected with a contamination. By this not only the sealing surfaces are affected, but also the interior of the connector, which should actually have been protected by the two protecting covers. These protecting covers have to be removed prior to the assembly in order to form the preassembled unit.

Furthermore the use of protecting caps on threaded parts is known. These protecting caps are screwed or pressed into the connecting sleeve in the case of inside threads. In the case of outside threads the protecting caps are stuck onto the threaded part. They serve to protect the threaded part during the transport. They have to be removed prior to mounting the part concerned.

The U.S. Pat. No. 4 775 174 shows a tube- or hose connector for the transport of a fluid, which at one end has a ring type nipple with a cross hole, which serves to mount the connector at an aggregate for receiving a banjo bolt having a head and a threated shank as well as two gaskets, where the ring type nipple, the banjo bolt, and the gasket form a preassembled unit. The banjo bolt is held in its preassembled position by a metal retainer ring, by which the gasket at the head side of the banjo bolt is secured as well. For the securing of the other gasket a groove is provided in the banjo bolt close to the threaded shank. With this preassembled unit it is not clear, however, how the retainer ring gets into the interior of the ring type nipple and into its groove provided on the shank of the banjo bolt.

SUMMARY OF THE INVENTION

It is the object of the invention to further advance a tube- or hose connector of the type described above, that the safety of its assembly is considerably improved. It is to be made possible that the assembly can be performed faster and better, a fluid tight connection is established, and a damage of the aggregate or the individual parts is avoided.

According to the invention this is achieved with the tube- or hose connector of the type described above, in that a protecting cap is provided to hold together a premounted unit of ring type nipple, banjo bolt, and the two gaskets, which has an approximately U-shaped form with a clamp, at the one end of which a flank overlaps the head of the banjo bolt and at the other end of which a protecting cover for the threaded shank of the banjo bolt is provided, and that the protecting cap has an extension supporting itself at the threaded shank of the banjo bolt, and that the protecting cover is borne pivotably at the clamp. With this new connector a protecting cap for the premounted unit is created and protecting covers for the ring type nipple are avoided. The connector provided on one or both sides is premounted at the manufacturer of the connector by putting the gasket at the head side onto the banjo bolt, sticking the banjo bolt through the cross hole of the ring type nipple, putting on the gasket on the threaded shank side, and fitting the new protecting cap. By this the protecting cap not only holds the pieces together, but with its protecting cover also closes the opening on the threaded shank side of the banjo bolt. The thread of the banjo bolt is protected at the same time, as well as the sealing surfaces on the ring type nipple and the gaskets. The premounted unit is protected from dust and is delivered to the automotive factory thus. For the assembly a mechanic takes such a connector and pivots the protecting cover away from the free end of the banjo bolt, by which the protecting cap remains on the connector, though, and ensures that the premounted unit cannot fall apart. This fit of the protecting cap on the premounted unit in spite of the removed protecting cover is obtained by the extension on the clamp, which supports itself on the threaded shank, also reaching over and holding the gasket on the threaded shank side. The banjo bolt, held in this position by the protecting cap, is aligned with its axis to the axis of the screw socket on the aggregate. The mechanic takes the head of the banjo bolt with one hand and can be certain that he can screw in the banjo bolt one or two turns by hand, without the danger that of the gaskets or the protecting cap falling down. After this initial screwing-in the protecting cap is removed from the connector by hand, which can be done by taking a hold of the protecting cover or the clamp. Here also no parts of the premounted unit can be lost, because the banjo bolt is already set in the thread of the screw socket. A tool can now be used without danger, because the head of the banjo bolt is only at this point accessible for the tool by removing the protecting cap. With a high certainty a fluid tight connection is achieved.

The new protecting cap has a number of advantages. The assembly time at the conveyor is reduced, because the premounted unit is made by the manufacturer. This premounted unit is effectively protected during the transport concerning all its individual parts. A falling down of the gaskets, regardless of the assembly position, is not possible anymore. The banjo bolt itself also cannot fall down during the assembly, so that a damage to its threaded shank is also prevented. The new protecting cap also forces the mechanic to carefully screw in the banjo bolt by hand, and relieves the mechanic of checking whether or not gaskets have fallen down. Damage to the thread of the screw socket of the aggregate is avoided with certainty. The new protecting cap is reusable or easily recycled. It can be used regardless of what material the gaskets are made from, for instance copper, plastic, etc. There is no seperate storage of banjo bolts, gaskets, and connector pieces at the conveyor. Finally, the protecting cap must be removed during the assembly in order for the head of the banjo bolt to become accessible to the tool. By this it is avoided that the protecting cap is accidently screwed down as well.

The extension can have a C-shaped form and may be snapable onto the threaded shank with its end. This makes it possible to hold the gaskets on the sealing surfaces of the ring type nipple with some amount of pretension and insofar to ensure the dust tightness of this connection during the assembly. The head bearing area of the banjo bolt is included in this protection. This relative position of the parts is ensured even when the protecting cover has already been pivoted away. On the other hand does the extension with its C-shaped form allow an easy removal from the threaded shank of the banjo bolt before applying the tool.

The protecting cover may have a rim covering the outer circumference of the free end of the threaded shank and one or more projections extending into the free end of the banjo bolt. The rim extends further to the outside than the outer diameter of the thread, so that the threaded shank is effectively protected especially at its free end during the transport. The protecting cover lies on the free end of the banjo bolt in a sealing fashion and protects against dust.

This is attained especially when the flank overlapping the head of the banjo bolt and the protecting cover and/or the extension can be connected to the premounted unit under prestress. This also prevents the parts from chafing against each other during the transport.

The flank overlapping the head of the banjo bolt has a contour which allows to grab the head of the banjo bolt by hand. By this the screwing-in of the banjo bolt by hand is not obstructed in spite of the mounted protecting cap. It suffices when the flank has a smaller width than the span of the jaw of the tool or is provided with indentations or such. The width of the flank may correspond to the width of the clamp of the protecting cap.

On the other hand there is the possibility to form the extension to be ring-shaped and to provide it with a predetermined break point, so that the protecting cap may be removed after carefully screwing in the banjo bolt by seperating the ring-shaped extension.

In a further development of the invention the extension can at the same time be the gasket at the threaded shank side of the unit and may be connected to the clamp via a tear-through point. This possibility is given when plastic gaskets are used. It is then possible to injection-mould the protecting cap and the gasket or the gaskets in one piece and to provide the tear-through points. So a further extension may be provided on the clamp being at the same time the gasket at the head side and being connected to the clamp via a tear-through point. On the other hand it is possible to use metal gaskets, to injection-mould the protecting cap from plastic, and to hold one or both of the gaskets to the clamp by snap fasteners, so that the gasket at the threaded shank side has at the same time the function of the extension of the clamp.

The protecting cover may be formed to be a grip for the complete removal of the protecting cap from the partially mounted unit. The protecting cover on its upper side and the clamp on its outer side may be formed in the way of a snap fastener to lock the protecting cover in the pivoted away position without removing the protecting cap from the premounted unit. On the other hand the removal of the protecting cap may be accomplished by taking the flank overlapping the head of the banjo bolt.

BRIEF DESCRIPTION OF THE DRAWINGS

The invention is further explained and described with the aid of preferred embodiments. Shown are.

DETAILED DESCRIPTION

Figure 1:
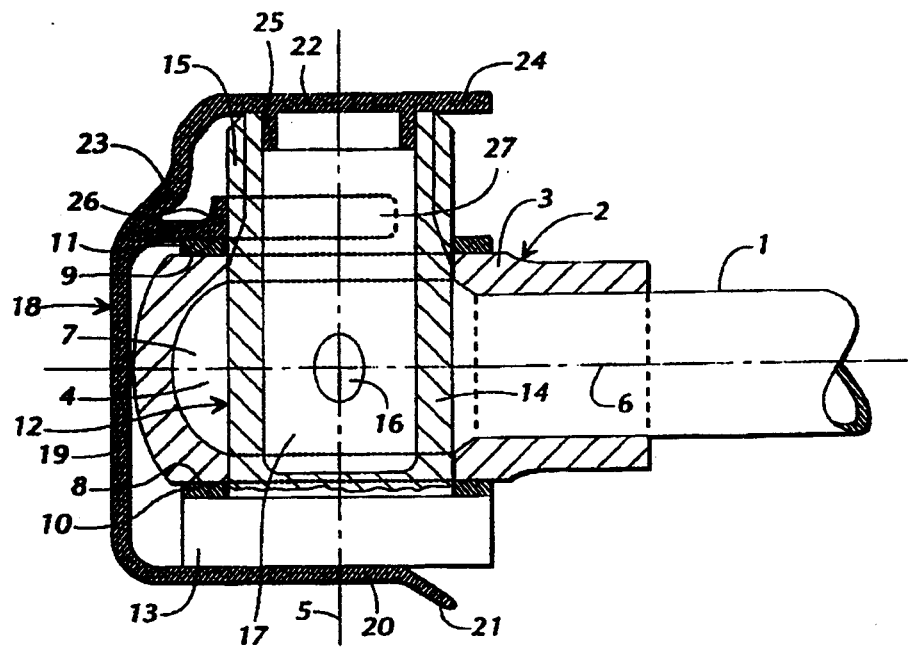
FIG. 1 a cut through the tube- or hose connector with the attached protecting cap in the region of one end, FIG. 2 a side view of the protecting cap according to FIG. 1, FIG. 3 a plan view of the protecting cap according to the cut III—III in FIG. 2, FIG. 4 a plan view of the protecting cover of the protecting cap according to the cut IV—IV in FIG. 2, FIG. 5 a similar representation as FIG. 3, but of a different embodiment, FIG. 6 a similar representation as FIG. 1, but of a different embodiment, and FIG. 7 a side view of the protecting cap in a further embodiment.

According to the embodiment of FIG. 1 the end of a tube 1 is soldered into a ring type nipple 2, which has a connecting sleeve 3 for this purpose. The ring type nipple 2 has a cross hole 4, the axis 5 of which extends perpendicular to an axis 6 of the connecting sleeve 3 resp. of the tube 1. The cross hole 4 widens inside the ring type nipple 2 to an interior 7, which is continuously connected to the interior of the tube 1. The ring type nipple 2 has parallel sealing surfaces 8 and 9, adjacent to which are gaskets 10 and 11.

A banjo bolt 12 has a head 13, connected to which is a drilled shank that passes into threaded shank 15. The drilled shank 14 usually has three openings 16, through which the interior 7 of the ring type nipple 2 is continuously connected to an interior 17 of the banjo bolt 12. The banjo bolt 12 is mounted with the two gaskets 10 and 11 in the way shown and forms a premounted unit, which is held by a protecting cap 18, which can be formed to be a plastic injection-moulded part. The protecting cap has an approximately U-shaped cross section resp. form and has a clamp 19, which extends approximately parallel to the axis 5, but which may be bent in its upper region. The protecting cap 18 has at one end of the clamp 19 approximately perpendicular to this a flank 20, which overlaps the head 13 of the banjo bolt 12. At the free end of the flank 20 there may be an angled-off projection 21 to make the attachment of the flank 20 to the head 13 easier. At the other end of the clamp 19 there is a protecting cover 22 which is borne pivotable with respect to the clamp 19 by an inward bulge 23 or by a thinning of the material. The protecting cover 22 has a rim 24 that protrudes radially over the threaded shank 15 and which protects especially the free end of the threaded shank 15 from damage. On its inner side the protecting cover 22 has one or more projections 25, with which it extends into the interior 17 of the threaded shank 15 and is held there. The protecting cover 22 closes the interiors 17 and 7 in a dust tight way and protects the threaded shank 15. On the inner side of the clamp 19 there is provided an extension 26, which has an approximately C-shaped form and which extends with its free ends 27 over about half the circumference of the threaded shank 15 of the banjo bolt 12. This extension 26 is put onto the threaded shank 15 of the banjo bolt 12 by a kind of snap effect, by which it overlaps the gasket 11 and holds the parts together under pretension in connection with the flank 20. Altogether the protecting cap 18 protects the sealing surfaces 8 and 9 and the gaskets 10 and 11 as well as the banjo bolt 12 and the ring type nipple 2. The tube- or hose connector is delivered by the manufacturer to the automotive factory as a premounted and protected unit, as shown in FIG. 1. Since the protecting cap 18 is put onto the parts under a pretension, on the one hand the necessary dust tightness is achieved and on the other hand prevents a chafing of the parts during the transport. During the assembly the tube- or hose connector is taken and the protecting cover 22 is pivoted away, so that the threaded shank 15 comes free. The protecting cap 18 with its clamp 19, flank 20 and extension 26 remains in its relative position shown in FIG. 1, though. The mechanic can now easily aligne the axis 5 of the banjo bolt 12 to the axis of the thread on the connector of the aggregate and take the head 13 of the banjo bolt 12 in its aligned position with his fingers and easily and carefully screw in the banjo bolt 12 by one or more turns. During this there is no danger of the banjo bolt 12 and/or the gaskets falling down, because they are still held by the protecting cap 18. Only when the threaded shank 15 has taken hold is the protecting cap fully removed. To do this, it can be taken by the pivoted away protecting cover 22 or the clamp 19 or also by the flank 20. As soon as the protecting cap 18 has been removed the head 13 of the banjo bolt 12 is freed, so that a tool may be applied, with which the banjo bolt 12 is tightened to the specified torque, and a fluid tight connection is obtained. It is understood that the connector at one end of the tube 1 may also be provided at the other end of the tube 1, where the same measures are to be taken. The tube- or hose connector may also have a tube 1 as well as a hose, or only a hose, etc.

Figure 2:
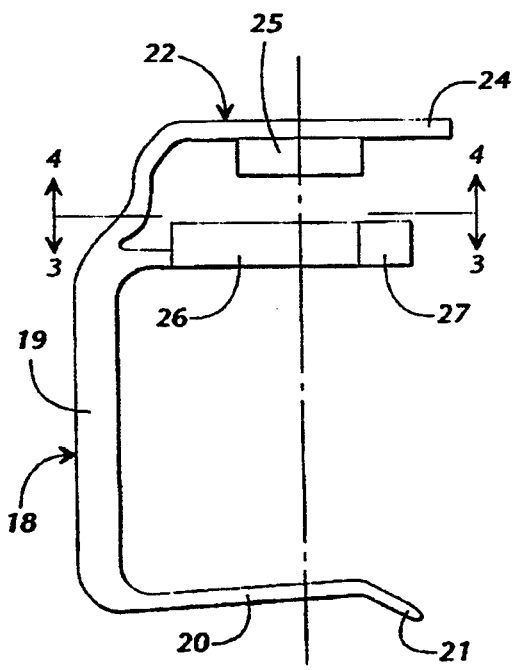
Figure 3:
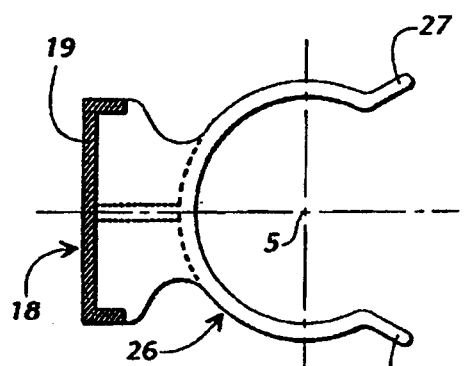
Figure 4:
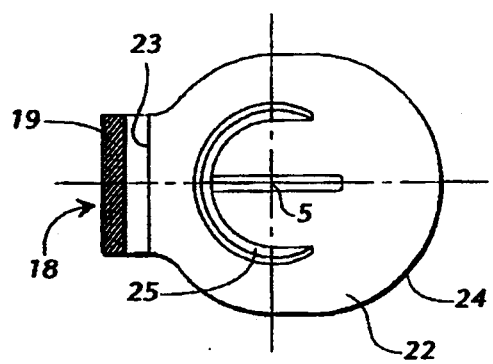

FIG. 2 again shows the protecting cap 18 in a side view with its details. From FIG. 3 the C-shaped form of the extension 26 can be seen especially well. Also the width of the clamp 18 relative to the outer diameter of the banjo bolt 12 can be seen. FIG. 4 shows a plan view of the inside of the protecting cover 22 with the projection 25. The projection 25 is formed asymmetrical here, in order to make the affixing of the protecting cover 22 against the pretension of the protecting cap 18 on the threaded shank 15 easier.

Figure 5:
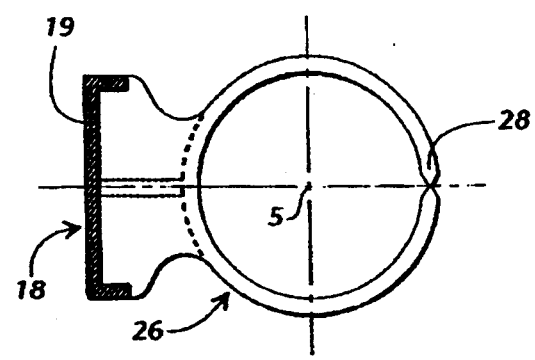

FIG. 5 shows an embodiment for which the extension 26 is not provided in the C-shaped form. In this case the extension 26 is closed in a ring shaped fashion and has a predetermined break point 28, which is broken when removing the protecting cap 18.

Figure 6:
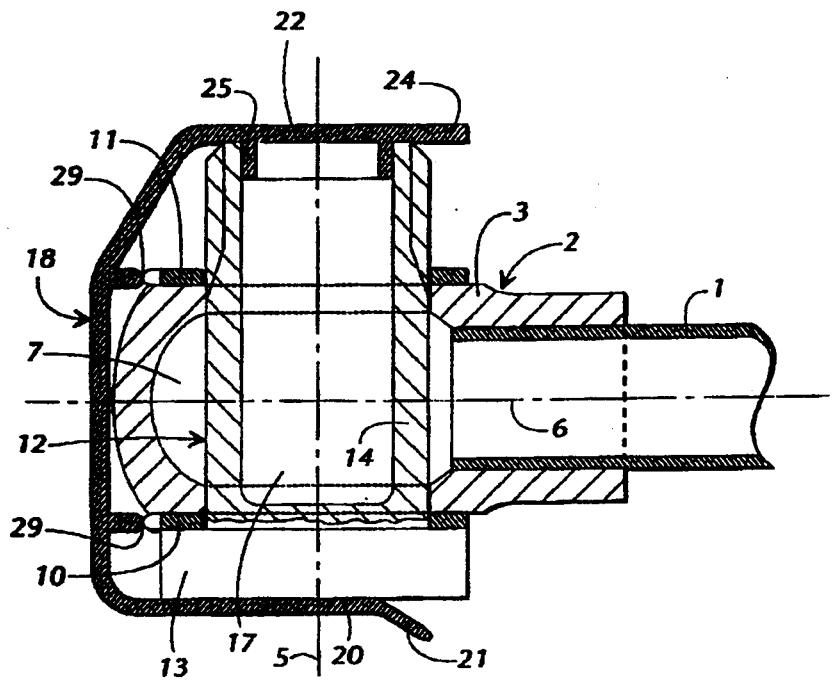

FIG. 6 shows a similar representation as FIG. 1, but in a different embodiment. The gaskets 10 and 11 are injection-moulded in one piece together with the protecting cap 18 and have tear-through points 29. The extension 26 as an individual part is left away. Its function is taken by the gasket 11. When gaskets 10 and 11 are to be of metal, they can, similar to the way shown in FIG. 6, be connected to snap-connector elements not shown, which are then provided in the positions of the tear-through points 29.

Figure 7:
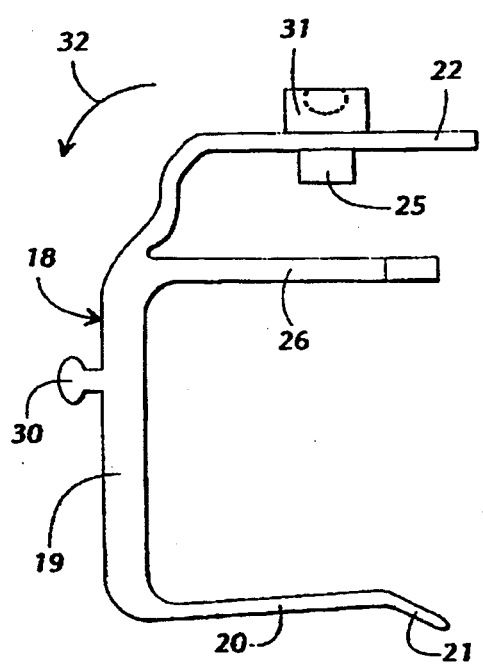

FIG. 7 shows the protecting cap 18 with snap fasteners 30, 31 on the outer side of the clamp 19 and on the outer side of the protecting cover 22, with the aid of which the protecting cover 22 is fixed in the pivoted position according to the arrow 32.

While the foregoing specification and drawing set forth preferred embodiments of the invention, it will be understood by those skilled in the are that variations and modifications thereof can be made without departing from the spirit and scope of the invention, as set forth in the following claims.

We claim:

1. A tube or hose connector for the transport of a fluid, having at least at one end a ring type nipple (2) with a transverse hole (4), which serves to mount a banjo bolt (12) having a head (13) and a threaded shank (15) as well as two gaskets (10,11), wherein a protecting cap (18) is provided to hold together a premounted unit of ring type nipple (2), banjo bolt (12), and the two gaskets (10,11), which has an approximately U-shaped form with a clamp (19), at the one end of which a flank (20) overlaps the head (13) of the banjo bolt (12) and at the other end of which a protecting cover (20) for the threaded shank (15) of the banjo bolt (12) is provided, and that the protecting cap (18) has an extension (26) abutting the threaded shank (15) of the banjo bolt (12), and that the protecting cover (22) is pivotable about the clamp (19).

2. A connector according to claim 1, wherein the extension (26) has a C-shaped form and is formed to be snappable to the threaded shank (15).

3. A connector according to claim 1, wherein the protecting cover (22) has a rim (24) covering the outer circumference of the free end of the threaded shank (15) and one or more projections (25) extending into the free end of the banjo bolt (12).

4. A connector according to claim 1, wherein the flank (20) overlapping the head (13) of the banjo bolt (12) and the protecting cover (22) and/or the extension (26) are connected to the premounted unit under prestress.

5. A connector according to claim 1, wherein the flank (20) overlapping the head (13) of the banjo bolt (12) is configured such that the head (13) of the banjo bolt (12) can grabbed by hand.

6. A connector according to claim 1, wherein the extension (26) is formed to be ring-shaped and has a predetermined break point (28).

7. A connector according to claim 1, wherein the extension (26) further includes a gasket (11) at the threaded shank side of the unit and connected to extension (26) via a tear-through point (29).

8. A connector according to claim 1, and further including an extension (26) provided on the clamp (19), and gasket (10) at the head connected to the clamp (19) via a tear-through point (29).

9. A connector according to claim 1, wherein one or both gaskets (10, 11) are held to the clamp (19) by snap fasteners.

10. A connector according to claim 1, wherein the protecting cover (22) is formed to be a grip for the complete removal of the protecting cap (18).

* * * * *